(12) United States Patent
Feng et al.

(10) Patent No.: US 8,414,859 B2
(45) Date of Patent: Apr. 9, 2013

(54) METHOD FOR MAKING CARBON NANOTUBE STRUCTURE

(75) Inventors: Chen Feng, Beijing (CN); Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 293 days.

(21) Appl. No.: 12/855,875

(22) Filed: Aug. 13, 2010

(65) Prior Publication Data
US 2011/0142744 A1 Jun. 16, 2011

(30) Foreign Application Priority Data

Dec. 11, 2009 (CN) .......................... 2009 1 0250641

(51) Int. Cl.
*D01F 9/12* (2006.01)
(52) U.S. Cl. ...................... 423/447.1; 977/742; 977/843
(58) Field of Classification Search .... 423/447.1–447.3, 423/445 B; 977/742–754, 842–848; 428/367
See application file for complete search history.

(56) References Cited

U.S. PATENT DOCUMENTS

| 7,045,108 B2 | 5/2006 | Jiang et al. | |
|---|---|---|---|
| 2005/0170089 A1* | 8/2005 | Lashmore et al. | 427/248.1 |
| 2007/0166223 A1* | 7/2007 | Jiang et al. | 423/447.1 |
| 2007/0292614 A1 | 12/2007 | Liu et al. | |
| 2008/0248235 A1 | 10/2008 | Feng et al. | |
| 2009/0208708 A1 | 8/2009 | Wei et al. | |

FOREIGN PATENT DOCUMENTS

CN 1948144 A 4/2007

* cited by examiner

*Primary Examiner* — Daniel C McCracken
(74) *Attorney, Agent, or Firm* — Altis Law Group, Inc.

(57) ABSTRACT

The present disclosure relates to a method for making a carbon nanotube carbon nanotube structure. The method includes steps of providing a tubular carbon nanotube array; and drawing out a carbon nanotube structure from the tubular carbon nanotube array by using a drawing tool. The carbon nanotube structure is a carbon nanotube film or a carbon nanotube wire.

19 Claims, 14 Drawing Sheets

METHOD FOR MAKING CARBON NANOTUBE STRUCTURE

CROSS-REFERENCE TO RELATED APPLICATIONS

This application claims all benefits accruing under 35 U.S.C. §119 from China Patent Application No. 200910250641.1, filed on 2009 Dec. 11, in the China Intellectual Property Office, the disclosure of which is incorporated herein by reference. This application is related to commonly-assigned applications entitled, "METHOD FOR MAKING CARBON NANOTUBE FILM", filed Aug. 13, 2010, Ser. No. 12/856,541; "METHOD FOR MAKING CARBON NANOTUBE STRUCTURE", filed Aug. 13, 2010, Ser. No. 12/855,879; "METHOD AND APPARATUS FOR FORMING CARBON NANOTUBE ARRAY", filed Aug. 13, 2010, Ser. No. 12/855,883.

BACKGROUND

1. Technical Field

The present disclosure relates to a method for making a carbon nanotube structure.

2. Description of Related Art

Carbon nanotubes are tubules of carbon generally having a diameter of about 0.5 to about 100 nanometers, and composed of a number of coaxial cylinders of graphite sheets. Carbon nanotubes have interesting and potentially useful thermal, electrical, and mechanical properties, and have recently attracted a great deal of attention for use in different applications such as field emitters, gas storage and separation, chemical sensors, and high strength composites.

However, the main obstacle to actual application of carbon nanotubes is their difficulty to process due to the powder form of the carbon nanotube products. Therefore, forming separate and tiny carbon nanotubes into manipulable carbon nanotube structures is necessary. The manipulable carbon nanotube structure can be a carbon nanotube film, a carbon nanotube wire, or a carbon nanotube cable.

Recently, as disclosed by U.S. Pat. No. 7,045,108 to Jiang et al., an untwisted carbon nanotube wire has been fabricated by drawing from a carbon nanotube array. The untwisted carbon nanotube wire is free standing and includes a plurality of carbon nanotubes joined end-to-end by van der Waals attractive force therebetween. The carbon nanotubes in the untwisted carbon nanotube wire are substantially aligned along the length direction of the carbon nanotube wire. Thus, this carbon nanotube wire has good properties, such as thermal and electrical conductivities, along the direction of the aligned carbon nanotubes. Therefore, the carbon nanotube wire can be used in many different fields. Similarly, a carbon nanotube film can be fabricated by drawing a film from the carbon nanotube array.

However, sizes of the carbon nanotube wire and carbon nanotube film, which are directly drawn from the carbon nanotube arrays, are restricted by the sizes of the carbon nanotube arrays. The carbon nanotube array is grown on a flat surface of a silicon wafer by using a chemical vapor deposition (CVD) method. More specifically, a catalyst film is deposited on the flat surface of the silicon wafer, and then the silicon wafer is disposed and heated in a tube furnace. Carbon source gas and protective gas are introduced into the tube furnace and the carbon source gas is pyrolyzed by an action of the catalyst film at elevated temperature to grow the carbon nanotube array on the flat surface of the silicon wafer. During the growing, the inner gas pressure of the tube furnace is less than the atmosphere pressure outside the tube furnace. Therefore, the sidewall of the tube furnace has to bear an inward pressure difference applied thereon. When the tube furnace with a diameter of about 10 inches and a length of about 2 meters has the inner gas pressure of about 10 torr, the pressure difference between inside and outside of the tube furnace is about 50,000 Newton. However, if the diameter of the tube furnace increases to 40 inches, the pressure difference could reach to about 200,000 Newton. Further, as the increase of the diameter of the tube furnace, the curvature of the sidewall of the tube furnace decreases, and thus weakens the support of the sidewall. Therefore, as the increase of the diameter of the tube furnace, a large inward pressure difference may cause a damage of the tube furnace.

Accordingly, the tube furnace with a larger diameter can hardly be achieved. The conventional tube furnace for growing the carbon nanotube array has a diameter of about 10 inches. Therefore, the silicon wafer disposed inside the tube furnace should have a diameter less than 10 inches, such as 8 inches. An original carbon nanotube film directly drawn from the carbon nanotube array grown on that 8-inch-silicon-wafer has a width restricted to 8 inches. The diameter of the carbon nanotube wire is also restricted.

What is needed, therefore, is to provide a method for making a carbon nanotube structure having relatively large size

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another", "an", or "one" embodiment in this disclosure are not necessarily to the same embodiment, and such references mean at least one.

Figure 1:
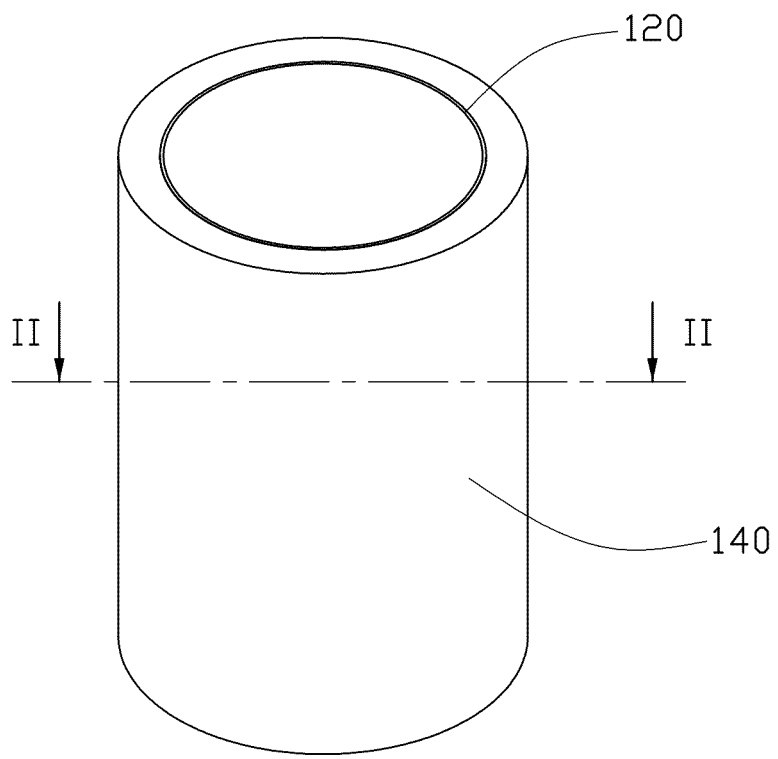
FIG. 1 is a schematic structural view of an embodiment of a tubular structure with tubular carbon nanotube array formed on an inner surface thereof.
Figure 2:
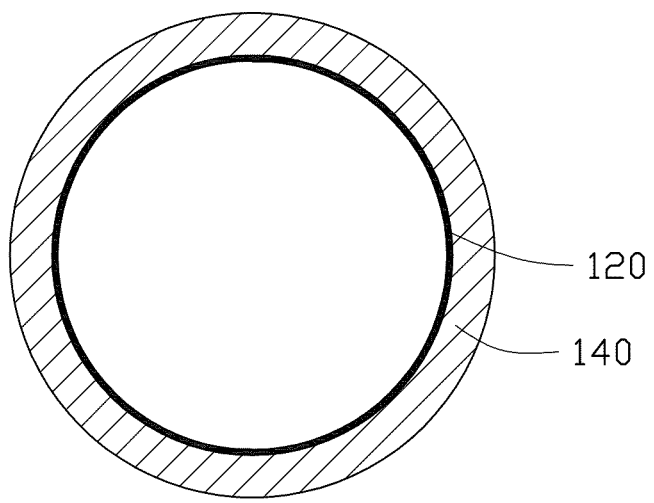
FIG. 2 is a cross sectional view of the tubular structure along a line II-II of FIG. 1.
Figure 8:
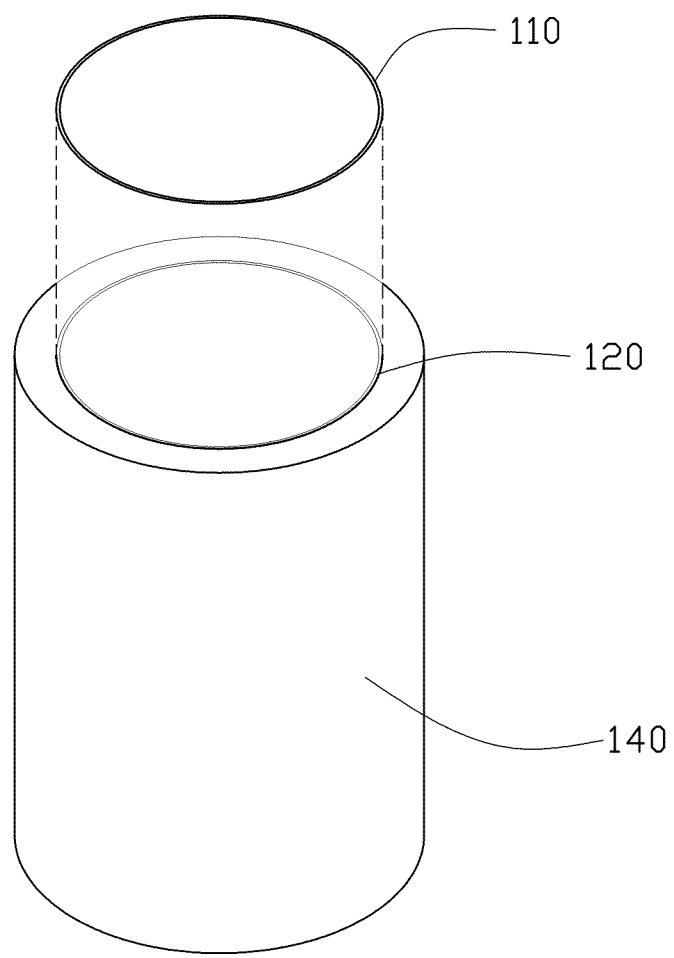
FIG. 8 is a schematic structural view of an embodiment of a drawing tool with a shape corresponding to a shape of the cross section of the tubular carbon nanotube array.

Referring to FIG. 1, FIG. 2 and FIG. 8, a method for making a carbon nanotube structure includes steps of:

S1, providing a tubular carbon nanotube array 120; and

S2, drawing out a carbon nanotube structure from the tubular carbon nanotube array 120 using a drawing tool 110 (e.g., adhesive tape, pliers, tweezers, or another tool allowing multiple carbon nanotubes to be gripped and pulled simultaneously).

In step S1, the tubular carbon nanotube array 120 is formed on a cylindrical surface of a substrate 140. The cylindrical surface can be a surface generated by a straight line intersecting and moving along a smooth plane curve line, i.e., the directrix, while remaining parallel to a fixed straight line that is not on or parallel to the plane of the directrix. The plane curve line of the tubular cylindrical surface can be a closed plane curve line. The cylindrical surface is a substantially smoothly curving surface.

In one embodiment, the tubular carbon nanotube array 120 is a super aligned carbon nanotube array and includes a plurality of carbon nanotubes substantially perpendicular to the surface of the substrate 140. The tubular carbon nanotube array 120 is essentially free of impurities such as carbonaceous or residual catalyst particles. The carbon nanotubes in the tubular carbon nanotube array 120 are closely packed together by van der Waals attractive force. Accordingly, a free-standing carbon nanotube structure can be drawn from the tubular carbon nanotube array 120. The carbon nanotube array 120 can be grown on the tubular cylindrical surface of the substrate 140 by using the chemical vapor deposition (CVD) method. In one embodiment, the method for growing the super aligned tubular carbon nanotube array 120 includes steps of:

(a) providing a substrate 140 including at least one cylindrical surface;

(b) forming a catalyst layer on the at least one cylindrical surface;

(c) annealing the substrate 140 with the catalyst at a temperature in an approximate range from about 300° C. to about 900° C. (e.g., 700° C.) in air from about 30 minutes to about 90 minutes;

(d) heating the substrate 140 with the catalyst at a temperature in an approximate range from about 400° C. to about 900° C. (e.g., 740° C.) in a furnace with a protective gas therein; and (e) supplying a carbon source gas into the furnace for about 5 minutes to 30 minutes and growing the super-aligned tubular carbon nanotube array 120 from the at least one cylindrical surface of the substrate 140.

The cylindrical surface of the substrate 140 can be, but is not limited to, a tubular cylindrical surface which can be the surfaces of a tubular structure or a columnar structure. The tubular structure can be a hollow tube or the tube with a linear shaped opening parallel to an axial direction of the tube. The columnar structure can be a solid column with an outer sidewall of the tubular cylindrical surface.

The substrate 140 can be a tubular structure with an inner wall and an outer wall, and the inner wall and the outer wall can be either or both the tubular cylindrical surface of the substrate 140.

Referring to FIG. 2, in one embodiment, the substrate 140 is the closed tubular structure with a closed round-annular cross section, and the tubular carbon nanotube array 120 is formed on the inner wall of the substrate 140 to form a closed tubular carbon nanotube array 120.

Figure 3:
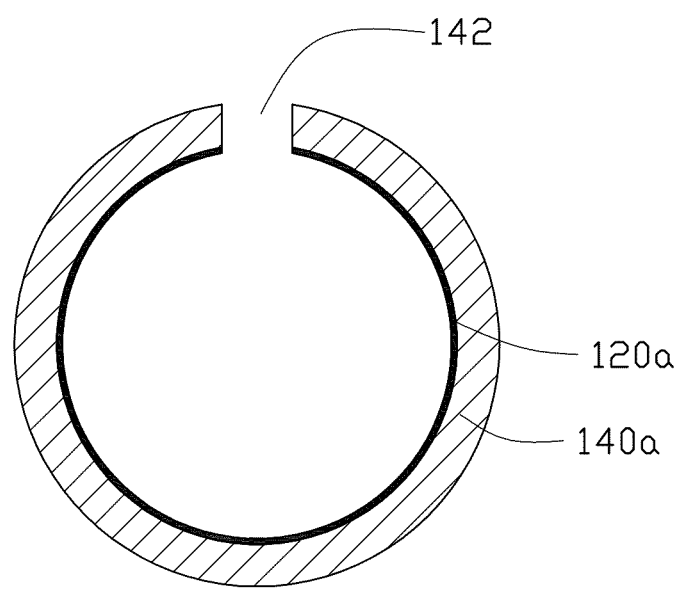
FIG. 3 is a cross sectional view of another embodiment of an opened tubular structure having a C shaped cross section with the tubular carbon nanotube array formed on the inner surface thereof.

Referring to FIG. 3, in another embodiment, the substrate 140a is an opened tubular structure with a substantially C shaped cross section, and the tubular carbon nanotube array 120a is formed on the inner wall of the substrate 140a, to form an opened tubular carbon nanotube array 120a. The opened tubular carbon nanotube array 120a includes a linear shaped opening 142 that can be substantially parallel to the axial direction of the opened tubular carbon nanotube array 120a.

Figure 4:
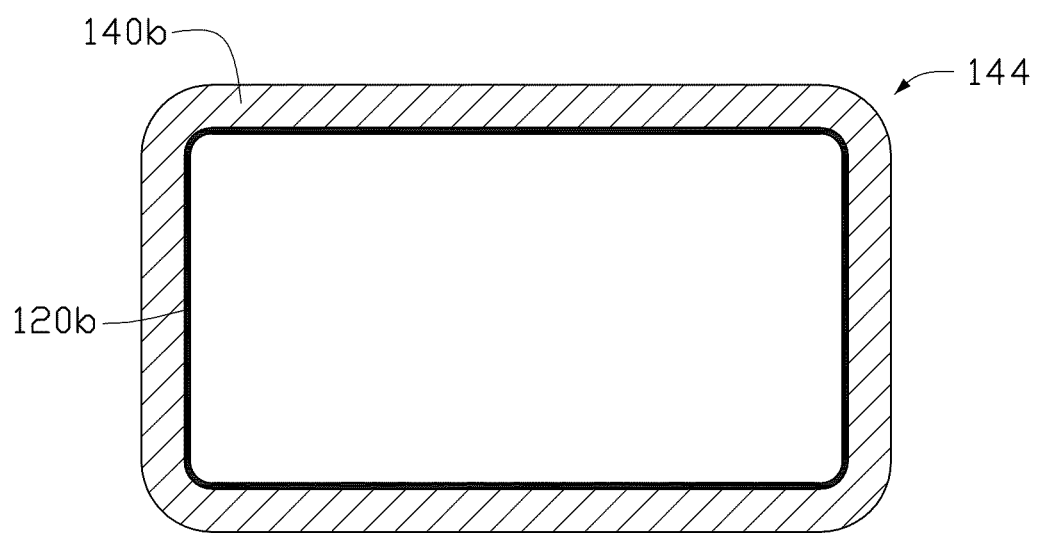
FIG. 4 is a cross sectional view of yet another embodiment of a closed tubular structure having a rectangle-annular cross section with the tubular carbon nanotube array formed on the inner surface thereof.

Referring to FIG. 4, in yet another embodiment, the substrate 140b is a closed tubular structure with a rectangle-annular cross section, and the tubular carbon nanotube array 120b is formed on the inner wall of the substrate 140b to form a closed tubular carbon nanotube array 120b. The rectangle-annular cross section has rounded corners 144.

Figure 5:
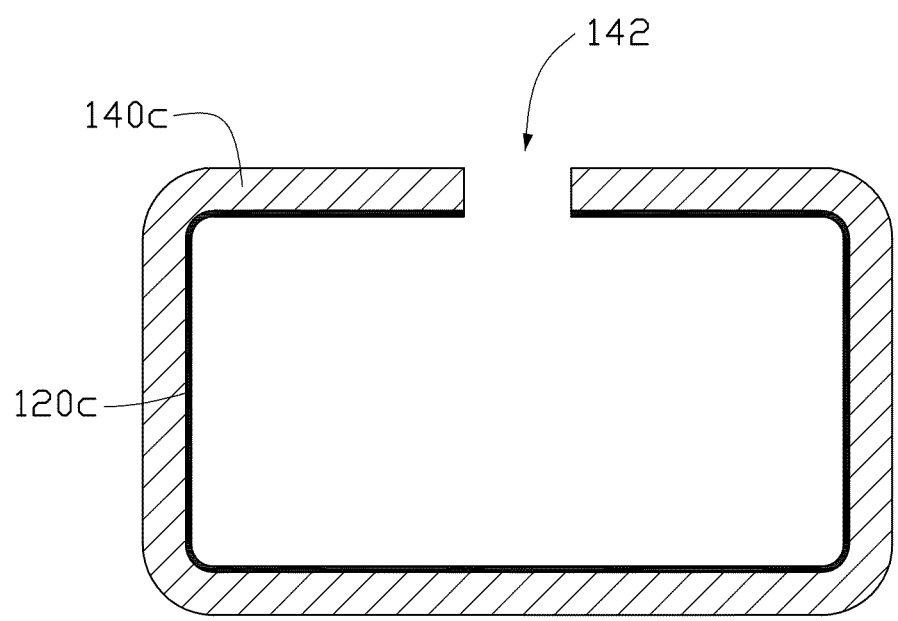
FIG. 5 is a cross sectional view of yet another embodiment of an opened tubular structure having a rectangle-annular cross section with the tubular carbon nanotube array formed on the inner surface thereof.

Referring to FIG. 5, in yet another embodiment, the substrate 140c is an opened tubular structure with a rectangle-annular cross section, and the tubular carbon nanotube array 120c is formed on the inner wall of the substrate 140c to form an opened tubular carbon nanotube array 120c. The opened tubular carbon nanotube array 120c includes a linear shaped opening 142 substantially parallel to an axial direction of the opened tubular carbon nanotube array 120c. The rectangle-annular cross section has an opening and rounded corners.

It is understood that the substrate does not limited to the above-mentioned shaped substrates 140, 140a, 140b and 140c, but can also have an oval-annular cross section or polygon-annular cross section with rounded corners. It is also understood that the tubular structure includes at least one opening at one end. In one embodiment, the tubular structure includes two openings at two opposite ends thereof.

The substrate can be a columnar structure including an outer sidewall, and the sidewall is the tubular cylindrical surface of the substrate. Similar to the tubular structure, the cross section of the columnar structure can have a round shape, an oval shape, or a polygon shape with rounded corners. Furthermore, the columnar structure can further include a linear shaped opening substantially parallel to an axial direction of the columnar structure.

The substrate must bear the annealing temperature and growing temperature during the growing of the carbon nanotube array. The material of the substrate can be quartz, high temperature glass, P-type silicon, N-type silicon, or metals with high melting points. In one embodiment, the tubular cylindrical surface of the substrate can include a silicon dioxide layer. In the embodiment shown in FIG. 2, the substrate 140 can be a quartz tube with smooth circumference surface.

Figure 6:
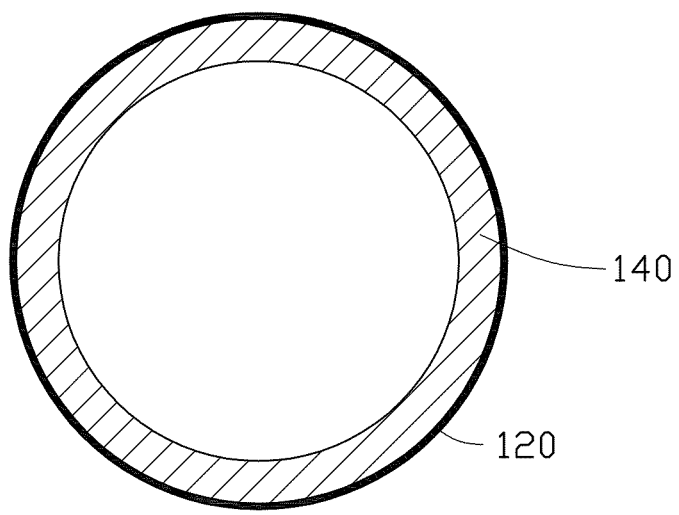
FIG. 6 is a cross sectional view of yet another embodiment of an closed tubular structure having a round-annular cross section with the tubular carbon nanotube array formed on the outer surface thereof.

Referring to FIG. 6, the tubular carbon nanotube array 120 can be also be grown on the outer sidewall of the tubular structure of the substrate 140.

The catalyst layer can be made of iron (Fe), cobalt (Co), nickel (Ni), or any alloy thereof. In one embodiment, the catalyst layer is a Fe layer with a thickness of 5 nanometers. The catalyst layer can be deposited on at least one of the inner wall or the outer wall of the quartz tube. When both the inner wall and the outer wall of the quartz tube has the catalyst layer thereon, two coaxial tubular carbon nanotube arrays 120 can be achieved on the inner wall and the outer wall of the quartz tube. In the embodiment shown in FIG. 2, the catalyst layer is disposed on the inner wall of the quartz tube. The protective gas can be made up of at least one of nitrogen ($N_2$), ammonia ($NH_3$), and a noble gas. The carbon source gas can be a hydrocarbon gas, such as ethylene ($C_2H_4$), methane ($CH_4$), acetylene ($C_2H_2$), ethane ($C_2H_6$), or any combination thereof.

When the furnace is a tube furnace, the substrate 140 can be disposed in the tube furnace with the axis of the tubular cylindrical surface substantially parallel to the axis of the tube furnace. Furthermore, a bracket can be used to support the substrate 140 in the furnace, thereby suspend the substrate 140 in the furnace.

The top surface of the tubular carbon nanotube array 120 is a tubular cylindrical surface substantially parallel and coaxial to the tubular cylindrical surface of the substrate 140. The tubular carbon nanotube array 120 can be substantially grown on the entire cylindrical surface of the substrate 140. The carbon nanotubes of the tubular carbon nanotube array 120 can be selected from single-walled, double-walled, and/or multi-walled carbon nanotubes. Diameters of the single-walled carbon nanotubes approximately range from about 0.5 nanometers (nm) to about 50 nm. Diameters of the double-walled carbon nanotubes approximately range from about 1 nm to about 50 nm. Diameters of the multi-walled carbon nanotubes approximately range from about 1.5 nm to about 50 nm. The length of the carbon nanotubes can be approximately 2 microns to approximately 10 millimeters. In one embodiment, the length of the carbon nanotubes can range from about 100 microns to about 900 microns.

If the substrate 140 is the opened tubular structure, the tubular carbon nanotube array 120 also includes a linear shaped opening. If the closed tubular carbon nanotube array 120 is formed on the closed tubular structure, a linear shaped section of the closed tubular carbon nanotube array 120 can be further removed and the opening tubular carbon nanotube array 120 can be formed on the closed tubular structure.

The step S2 can further includes steps of:

(f) selecting a carbon nanotube segment having a predetermined width from the tubular carbon nanotube array 120; and (g) pulling the selected carbon nanotube segment along a direction substantially parallel to the axis of the tubular carbon nanotube array 120 to achieve a carbon nanotube structure.

Figure 7:
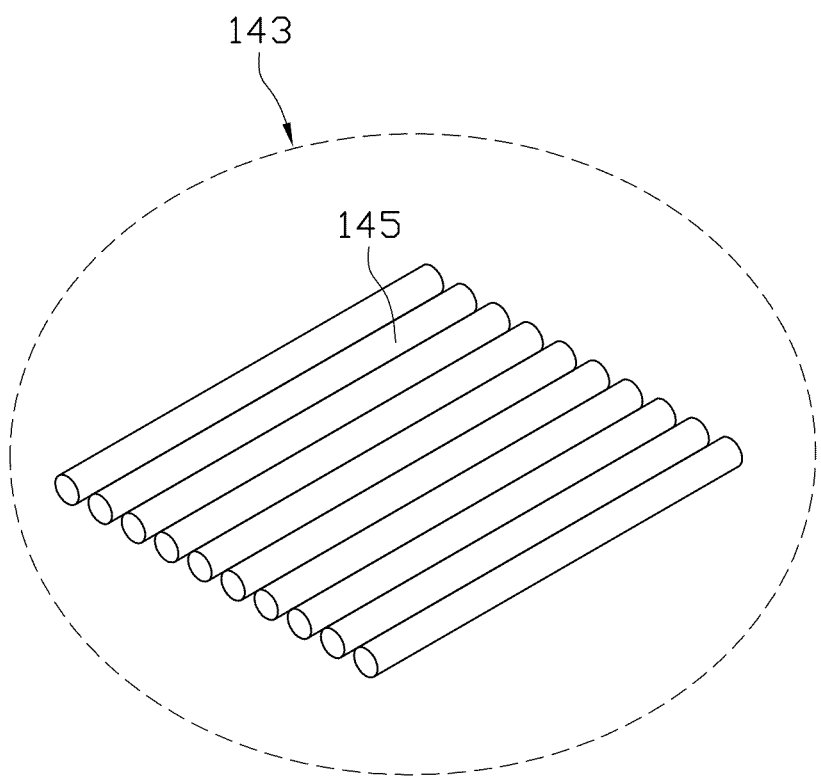
FIG. 7 is a schematic structural view of a carbon nanotube segment.

Referring to FIG. 7 and FIG. 8, in step (f), the carbon nanotube segment 143 includes a single carbon nanotube or a plurality of carbon nanotubes 145 substantially parallel to each other. The drawing tool 110 is used for selecting and drawing the initial carbon nanotube segment 145. In one embodiment, the initially selected carbon nanotube segment 145 can be located on the edge of one end of the tubular carbon nanotube array 120.

The drawing tool 110 can have a shape corresponding to the shape of the cross section of the tubular carbon nanotube array 120. In one embodiment, the drawing tool 110 is an adhesive ring, which is fit to the shape of the cross section of the tubular carbon nanotube array 120. The adhesive ring can have the same diameter as the cross section of the tubular carbon nanotube array 120. If the tubular carbon nanotube array 120 is a round hollow cylinder (i.e., the cross section of the tubular carbon nanotube array 120 has a shape of round ring), the drawing tool 110 can be an adhesive round ring. If the tubular carbon nanotube is a rectangular cylinder (i.e., the cross section of the tubular carbon nanotube array 120 has a shape of rectangular ring), the drawing tool 110 can be a rectangular ring. The step (f) of selecting can be performed by coaxially arranging the ring and the tubular carbon nanotube array 120 and bring them together, thereby adhering a ring shaped carbon nanotube segment to the drawing tool 110.

If the tubular carbon nanotube array 120 is grown on the inner wall of the tubular structure, the drawing tool 110 pulls/draws the carbon nanotube segment from the inner wall of the tubular structure. If the tubular carbon nanotube array 120 is grown on the outer wall of the tubular structure, the drawing tool 110 pulls/draws the carbon nanotube segment from the outer wall of the tubular structure. If both the inner wall and the outer wall of the tubular structure have the tubular carbon nanotube array 120. The drawing tool 110 can pull/draw the carbon nanotube segments from both the inner wall and the outer wall of the tubular structure at the same time by fitting the shape of the drawing tool 110 to the coaxial arranged two tubular carbon nanotube arrays 120.

In step (f), the drawing tool 110 moves away from the tubular carbon nanotube array 120 along the axial direction of the tubular carbon nanotube array 120, and thereby pulling the carbon nanotube segments at an even speed.

During the pulling process, as the initial carbon nanotube segment is drawn out, other carbon nanotube segments are also drawn out end-to-end due to the van der Waals attractive force between ends of adjacent segments. In general, the initially selected carbon nanotubes are drawn out from the tubular carbon nanotube array 120 by the movement of the drawing tool 110. The following carbon nanotubes that are adjacent to the initially selected carbon nanotubes are then drawn out by van der Waals attractive force between the following carbon nanotubes and the initially selected carbon nanotubes thereby forming the carbon nanotube structure with carbon nanotubes joined end-to-end by van der Waals attractive force therebetween. This process of drawing ensures that a continuous, uniform drawn carbon nanotube structure. The carbon nanotube structure can be a carbon nanotube film or a carbon nanotube wire. The shape of the carbon nanotube structure is related to the width of the selected carbon nanotube segment and any treatment after the carbon nanotube segments are drawn out.

The methods for forming the carbon nanotube wire and the carbon nanotube film are to be separately described.

Figure 9:
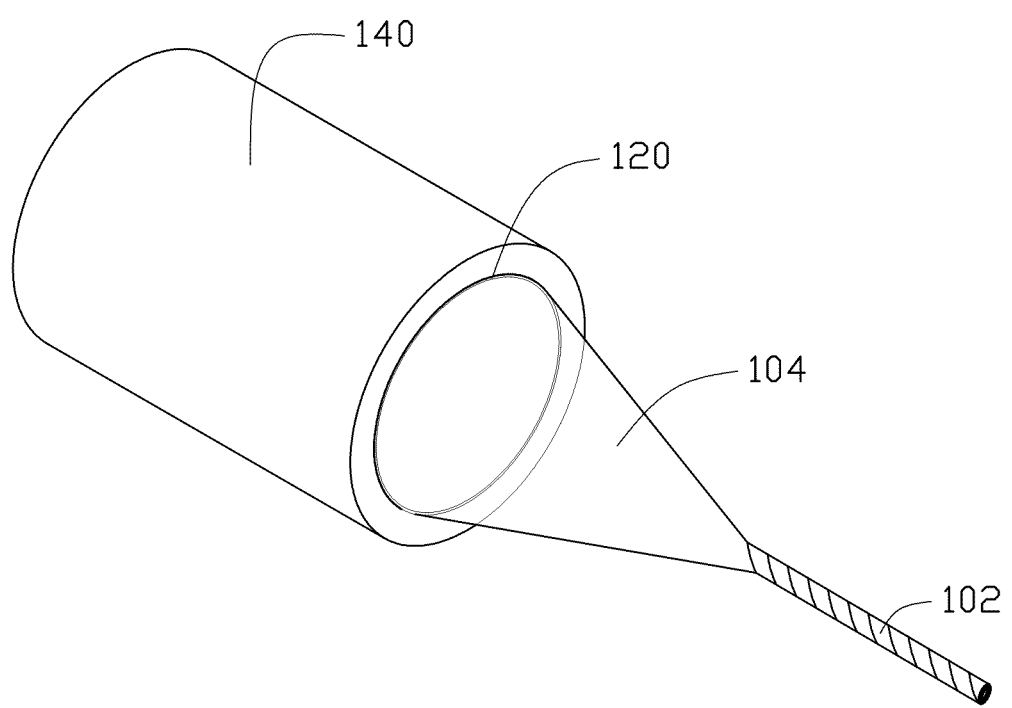
FIG. 9 is a schematic structural view of an embodiment of a process of drawing a twisted carbon nanotube wire from the tubular carbon nanotube array.

Referring to FIG. 9, in an embodiment of a method to form the carbon nanotube wire 102, the initial selected carbon nanotube segment can have a narrow width. After the carbon nanotube segments are successively drawn out from the tubular carbon nanotube array 120, a hollow cone structure 104 consisted by the carbon nanotube segments joined end-to-end can be formed. Then the hollow cone structure 104 can be treated at the tip thereof, thereby the carbon nanotube segments can be joined together with each other at the tip of the hollow cone structure 104 to form the carbon nanotube wire 102.

The treating step can be processed by applying an organic solvent to the carbon nanotube segments. The organic solvent can be applied at or near the tip of the hollow cone structure 104. After being soaked by the organic solvent, the adjacent substantially paralleled carbon nanotubes will bundle together, due to the surface tension of the organic solvent as the organic solvent volatilizes, and thus, the carbon nanotube wire 102 can be formed at the tip of the hollow cone structure 104. The organic solvent is volatile, and can be selected from the group consisting of ethanol, methanol, acetone, dichloroethane, chloroform, any appropriate mixture thereof. In one embodiment, the organic solvent is ethanol.

Figure 10:
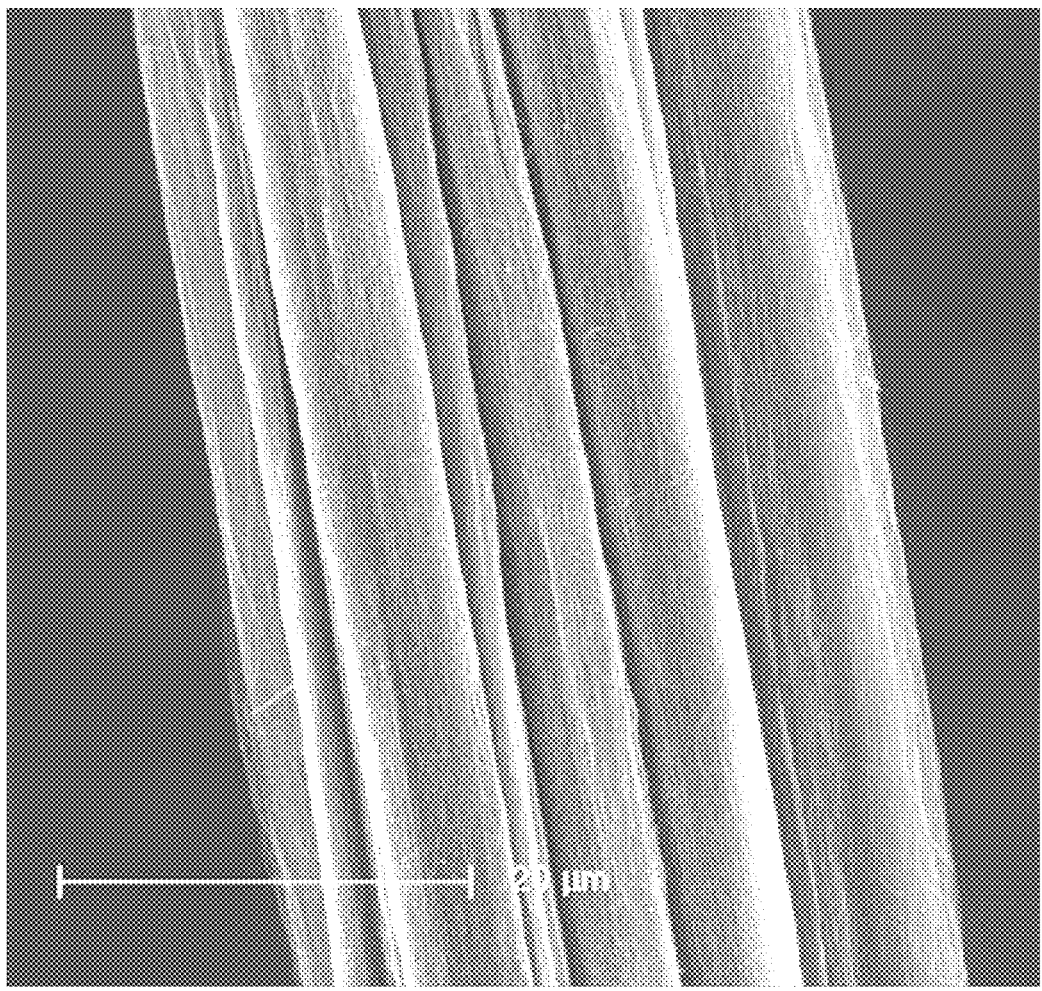
FIG. 10 shows a Scanning Electron Microscope (SEM) image of an untwisted carbon nanotube wire.

Referring to FIG. 10, the carbon nanotube wire 102 formed by applying the organic solvent to the carbon nanotube segments at the tip of the hollow cone structure is an untwisted carbon nanotube wire 102. The untwisted carbon nanotube wire 102 includes a plurality of carbon nanotubes substantially oriented along a same direction (i.e., a direction along the length of the untwisted carbon nanotube wire 102). The carbon nanotubes are substantially parallel to the axis of the untwisted carbon nanotube wire 102. More specifically, the untwisted carbon nanotube wire 102 includes a plurality of successive carbon nanotube segments joined end to end by van der Waals attractive force therebetween. Each carbon nanotube segment includes a plurality of carbon nanotubes substantially parallel to each other (prior to twisting), and combined by van der Waals attractive force therebetween. The carbon nanotube segments can vary in width, thickness, uniformity and shape.

The treating step can also be processed by twisting the carbon nanotube segments that are drawn out thereby twisted carbon nanotube wire 102 can be formed at the tip of the hollow cone structure 104. The carbon nanotube segments can be twisted by rotating the drawing tool 110 around an axis, which can be the axis of the tubular carbon nanotube array 120 during the pulling process.

Figure 11:
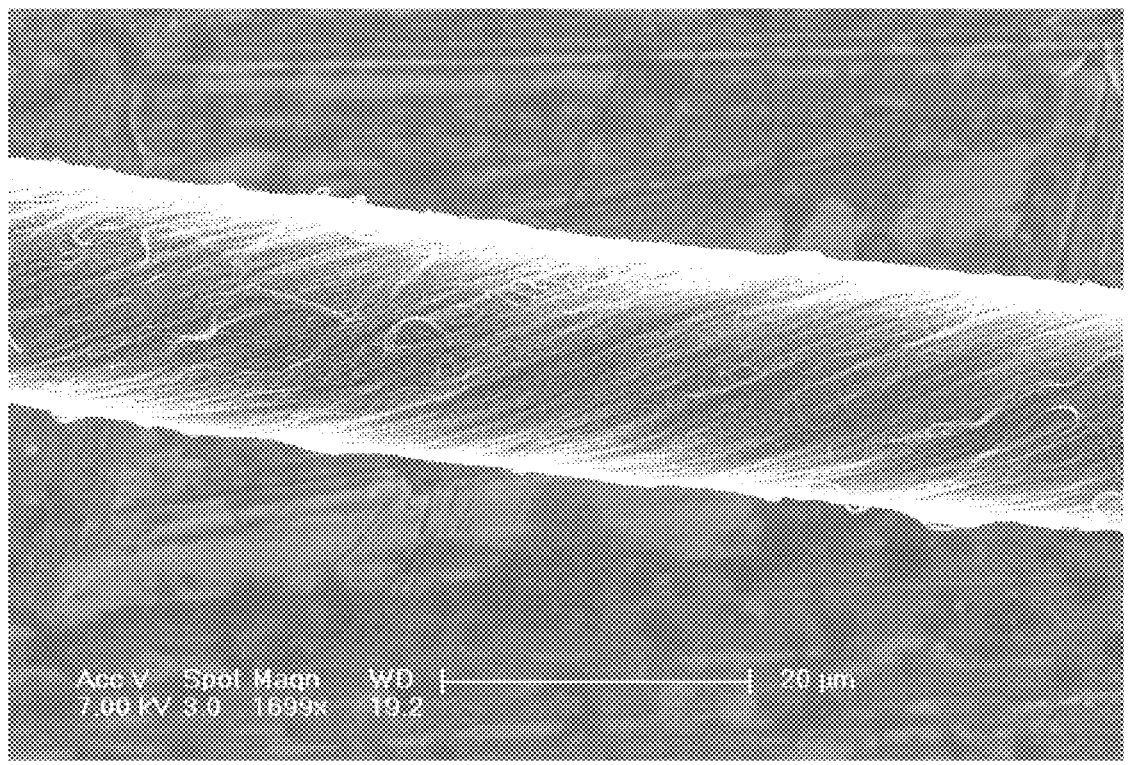
FIG. 11 shows an SEM image of a twisted carbon nanotube wire.

Referring to FIG. 11, the twisted carbon nanotube wire 102 includes a plurality of carbon nanotubes oriented around an axial direction of the twisted carbon nanotube wire 102. The carbon nanotubes are aligned around the axis of the twisted carbon nanotube wire 102 like a helix. More specifically, the twisted carbon nanotube wire 102 includes a plurality of successive carbon nanotube segments joined end to end by van der Waals attractive force therebetween.

Figure 12:
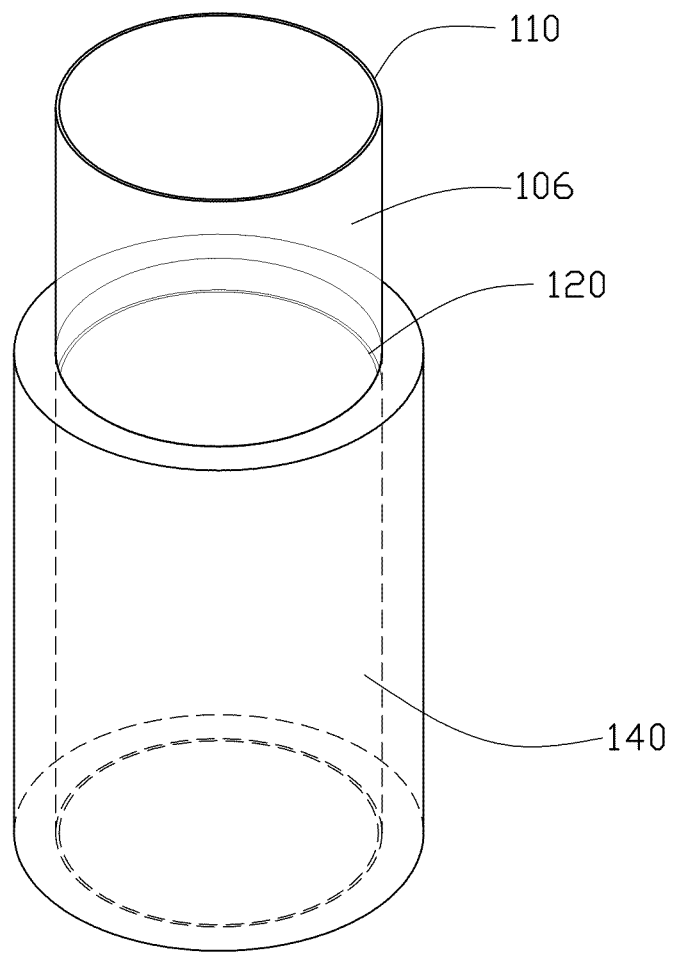
FIG. 12 is a schematic structural view of an embodiment of a process of drawing a carbon nanotube film from the tubular carbon nanotube array.

Referring to FIG. 12, to form the carbon nanotube film 106, the initial selected carbon nanotube segment can have a wide width. More specifically, a carbon nanotube film 106 with equal width to the initially selected carbon nanotube segment can be drawn from the carbon nanotube array 120. In one embodiment, the drawing tool 110 can have the same shape as the cross section of the tubular carbon nanotube array 120 (e.g., the drawing tool 110 can be the adhesive ring to select the ring shaped carbon nanotube segment). By pulling the drawing tool 110, a tubular carbon nanotube film 106 can be pulled out from the tubular carbon nanotube array 120. The tubular carbon nanotube film 106 can have the same diameter as the tubular carbon nanotube array 120.

Further, the tubular carbon nanotube film 106 can be flattened to form a planar carbon nanotube film 106. The planar carbon nanotube film 106 can be applied to a surface of a substrate. In one embodiment, to flatten the tubular carbon nanotube film 106, the adhesive ring of the drawing tool 110 is flexible, such as an elastic rubber ring with adhesive thereon. The elastic rubber ring can be broken at a point thereon. Then, the tubular carbon nanotube film 106 can be cut from the broken point along the axial direction of the tubular carbon nanotube film 106, to form a linear shaped opening on the tubular carbon nanotube film 106 along the axial direction thereof. A laser can be used to cut the tubular carbon nanotube film 106. After that, the drawing tool 110 can be extended to be straight, and thereby flatten the carbon nanotube film 106 from the linear shaped opening.

Figure 13:
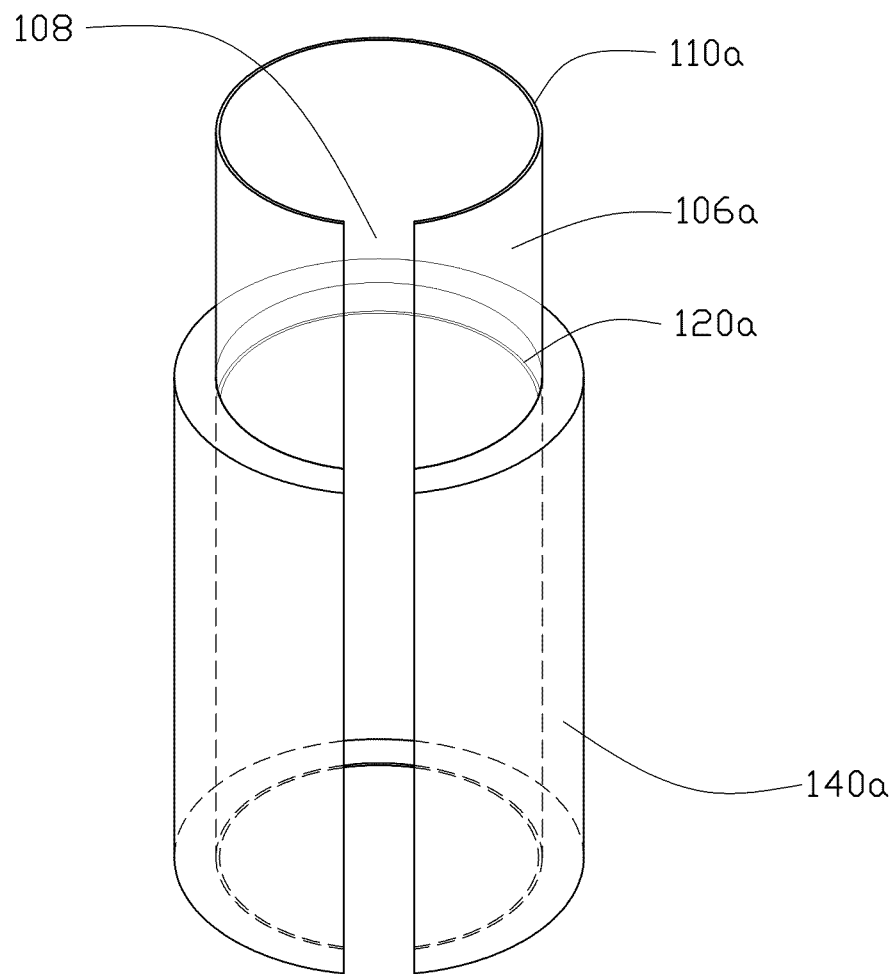
FIG. 13 is a schematic structural view of an embodiment of a process of drawing a carbon nanotube film with a linear shaped opening from the tubular carbon nanotube array.

Referring to FIG. 3 and FIG. 13, in another embodiment, the tubular substrate 140a has the linear shaped opening 142, thereby the tubular carbon nanotube array 120a formed on the tubular substrate 140a also has the linear shaped opening. The drawing tool 110 can have the same shape as the cross section of the tubular carbon nanotube array 120a and has an opening. Therefore, by using the drawing tool 110, the tubular carbon nanotube film 106a also has the linear shaped opening 108 along the axial direction of the tubular carbon nanotube film 106a. The tubular carbon nanotube film 106a can be flatten from the linear shaped opening 108 by extending the drawing tool 110 to be straight.

In yet another embodiment, the opening on the tubular carbon nanotube array 120a can be achieved by other methods, such as removing the linear shaped section from the tubular carbon nanotube array 120a.

Figure 14:
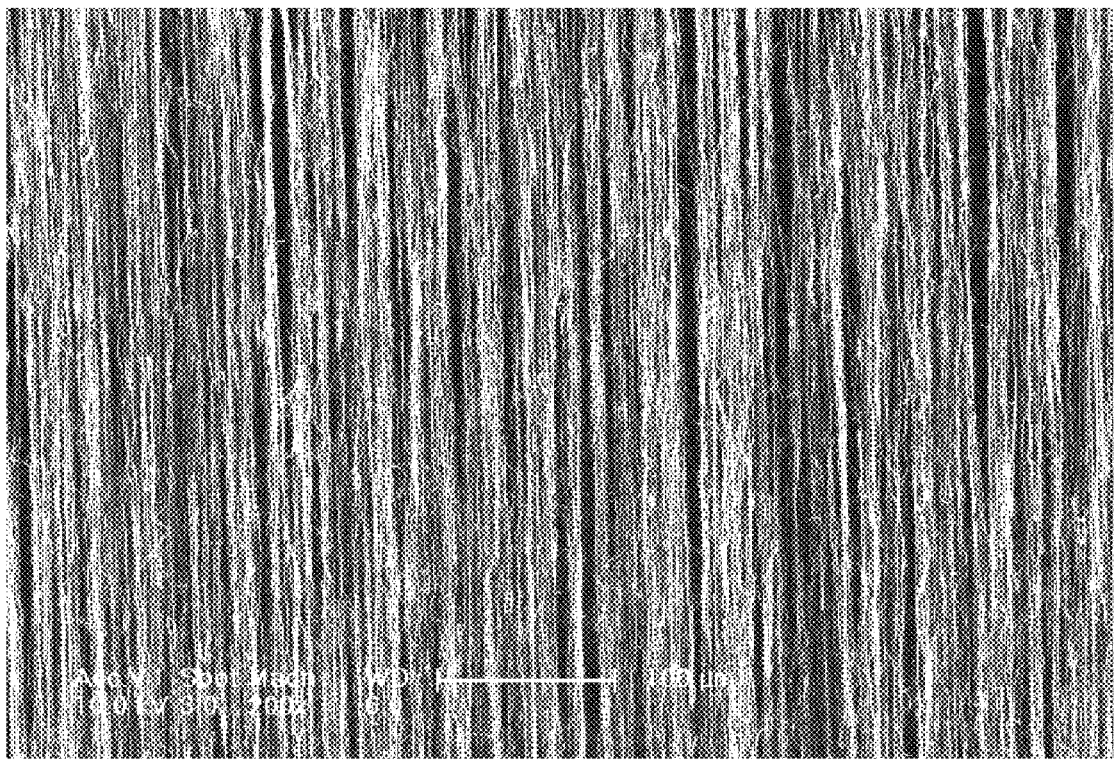
FIG. 14 shows a SEM image of a carbon nanotube film.

Referring to FIG. 14, the carbon nanotube film 106 can have a large specific surface area (e.g., above 100 $m^2/g$). In one embodiment, the carbon nanotube film 106 has a specific surface area in the range of about 200 $m^2/g$ to about 2600 $m^2/g$. In one embodiment, the carbon nanotube film 106 has a specific weight of about 0.05 $g/m^2$. The thickness of the carbon nanotube film 106 can be in a range from about 0.5 nm to about 50 nm.

The carbon nanotube film 106 includes a plurality of carbon nanotubes that are arranged substantially parallel to a surface of the carbon nanotube film 106. A large percentage of the carbon nanotubes in the carbon nanotube film 106 can be oriented along a preferred orientation, meaning that a large number of the carbon nanotubes in the carbon nanotube film 106 substantially are arranged along the same direction. An end of one carbon nanotube is joined to another end of an adjacent carbon nanotube substantially arranged along the same direction, by van der Waals attractive force. A low percentage of the carbon nanotubes are randomly arranged in the carbon nanotube film 106, and has a small if not negligible effect on the larger number of the carbon nanotubes in the carbon nanotube film 106 substantially arranged along the same direction. It can be appreciated that some variation can occur in the orientation of the carbon nanotubes in the carbon nanotube film 106. Microscopically, the carbon nanotubes oriented substantially along the same direction may not be perfectly aligned in a straight line, and some curve portions may exist. It can be understood that contact between some carbon nanotubes located substantially side by side and oriented along the same direction cannot be totally excluded.

More specifically, the carbon nanotube film 106 can include a plurality of successively oriented carbon nanotube segments joined end-to-end by van der Waals attractive force therebetween. The carbon nanotubes in the carbon nanotube film 106 are also substantially oriented along a preferred orientation. The width of the carbon nanotube film 106 relates to the carbon nanotube array from which the carbon nanotube film 106 is drawn.

For the reason that the tubular substrate can have the larger surface area that can be used to grow the carbon nanotube array thereon than the planner shaped substrate, and efficiently use the space in the furnace, the larger sized carbon nanotube array can be formed. Therefore, the carbon nanotube film that is drawn from the larger sized carbon nanotube array can have the larger width, and the carbon nanotube wire that is drawn from the larger sized carbon nanotube array can have the larger diameter. The carbon nanotube wire with larger width can be used as a transparent conductive film in a large sized device, such as the touch panel and liquid crystal display. The carbon nanotube wire with larger diameter can be used in cable with higher strength.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a carbon nanotube structure, the method comprising:
   providing a tubular carbon nanotube array comprising a linear shaped opening; and
   drawing out the carbon nanotube structure from the tubular carbon nanotube array by using a drawing tool.

2. The method of claim 1, wherein the tubular carbon nanotube array is formed by steps of:
   providing a substrate comprising at least one cylindrical surface;
   forming a catalyst layer on the at least one cylindrical surface; and
   growing the tubular carbon nanotube array on the at least one cylindrical surface by using a chemical vapor deposition method.

3. The method of claim 2, wherein the substrate is a column with an outer side wall and the tubular carbon nanotube array is grown on the outer side wall of the column.

4. The method of claim 2, wherein the substrate is a hollow tubular structure, the hollow tubular structure comprises an inner wall and an outer wall, the tubular carbon nanotube array is grown on at least one of the inner wall and the outer wall, and the carbon nanotube structure is pulled/drawn from at least one of the tubular carbon nanotube array.

5. The method of claim 2, wherein a cross section of the substrate is round-annular, C shaped, rectangle-annular with rounded corners, rectangle-annular with an opening and rounded corners, oval-annular or polygon-annular.

6. The method of claim 2, wherein the tubular carbon nanotube array is grown in a tube furnace by arranging an axis of the cylindrical surface along an axial direction of the tube furnace.

7. The method of claim 1, wherein the step of drawing comprises steps of:
   selecting a carbon nanotube segment having a predetermined width from the tubular carbon nanotube array; and
   pulling the carbon nanotube segment along a direction substantially parallel to an axial direction of the tubular carbon nanotube array.

8. The method of claim 7, wherein the carbon nanotube segment comprises a single carbon nanotube or a plurality of carbon nanotubes substantially parallel to each other.

9. The method of claim 7, wherein the selected carbon nanotube segment is located on an edge of one end of the tubular carbon nanotube array.

10. The method of claim 7, wherein the drawing tool has a shape corresponding to a cross section of the tubular carbon nanotube array.

11. The method of claim 10, wherein the tubular carbon nanotube array has a shape of a round hollow cylinder, and the drawing tool is an adhesive round ring.

12. The method of claim 11, wherein the step of selecting is performed by contacting the round adhesive ring with the tubular carbon nanotube array coaxially with each other.

13. The method of claim 10, wherein the carbon nanotube structure is a tubular carbon nanotube film.

14. The method of claim 13, further comprising steps of:
   breaking the drawing tool at a point thereon;
   cutting the tubular carbon nanotube film from the point along an axial direction thereby form a linear shaped opening on the tubular carbon nanotube film; and
   extending the drawing tool to be linear.

15. A method for making a carbon nanotube structure, the method comprising:
   providing a tubular carbon nanotube array comprising a linear shaped opening along an axial direction of the tubular carbon nanotube array;
   drawing out the carbon nanotube structure from the tubular carbon nanotube array by using a drawing tool to achieve a tubular carbon nanotube film having the linear shaped opening; and
   extending the drawing tool to be straight.

16. The method of claim 15, wherein the tubular carbon nanotube array is grown on an inner wall or an outer wall of a tube, and the tube comprises a linear shaped opening parallel to an axial direction of the tube.

17. A method for making a carbon nanotube structure, the method comprising:
   providing a tubular carbon nanotube array comprising a linear shaped opening;
   selecting an initial carbon nanotube segment from the tubular carbon nanotube array;
   drawing the initial carbon nanotube segment along a direction substantially parallel to an axis of the tubular carbon nanotube array by using a drawing tool, thereby pulling following carbon nanotube segments from the tubular carbon nanotube array end-to-end due to van der Waals attractive force therebetween; and
   treating the following carbon nanotube segments to achieve a carbon nanotube wire.

18. The method of claim 17, wherein the step of treating comprises steps of applying an organic solvent to at least some of the following carbon nanotube segments and volatilizing the organic solvent.

19. The method of claim 17, wherein the step of treating comprises a step of rotating the drawing tool during the drawing step to twisting the following carbon nanotube segments.

* * * * *